H. MOCK.
HEAT INSULATING DEVICE.
APPLICATION FILED OCT. 8, 1918.

1,349,727.

Patented Aug. 17, 1920.

Inventor
Hugo Mock

UNITED STATES PATENT OFFICE.

HUGO MOCK, OF NEW YORK, N. Y.

HEAT-INSULATING DEVICE.

1,349,727.   Specification of Letters Patent.   Patented Aug. 17, 1920.

Application filed October 8, 1918. Serial No. 257,325.

*To all whom it may concern:*

Be it known that I, HUGO MOCK, a citizen of the United States, residing at 930 St. Nicholas avenue, in the borough of Manhattan, city of New York, in the county of New York and State of New York, have invented certain new and useful Improvements in Heat-Insulating Devices, of which the following is a specification.

This invention relates to heat insulating devices and more specifically has for its object the provision of a fireless cooker which will be portable and inexpensive to manufacture.

A further object of the invention is to provide a heat insulating device which can be used either as a fireless cooker or as a portable refrigerator.

A further object of the invention is to provide a fireless cooker which can be compressed into a very small space when not in use and so will economize room.

Another object of the invention is to provide a fireless cooker, the parts of which can be used either independently or in combination to insulate a cooking vessel.

Figure 1:
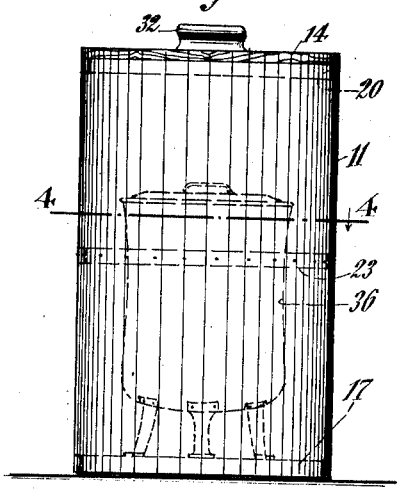
Figure 2:
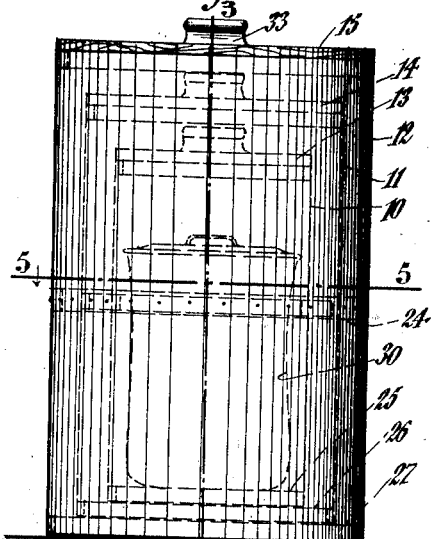
Figure 3:
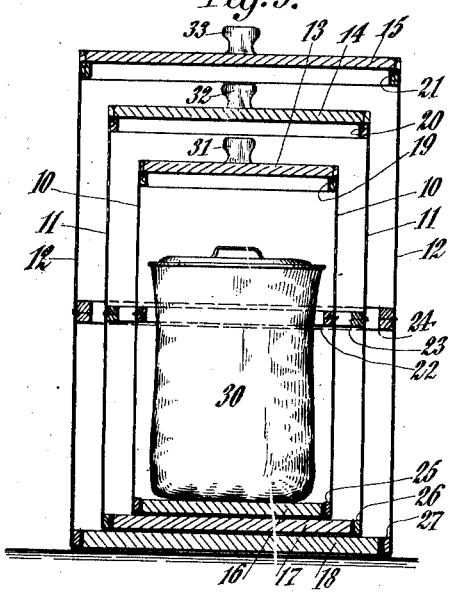
Figure 4:
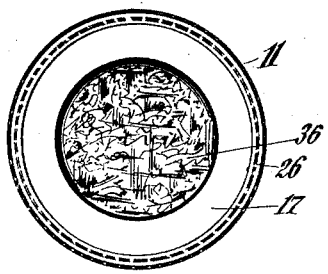
Figure 5:
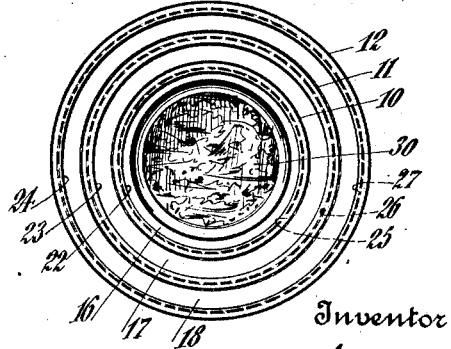
Figure 6:
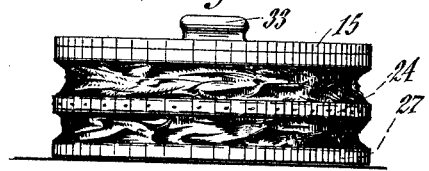

Further objects of the invention will be apparent from the drawings, in which,

Figure 1 represents a perspective view of the insulating unit hereinafter described, the unit being shown in expanded condition as in use, the cooking vessel being shown in dotted lines, Fig. 2 is a view similar to Fig. 1 showing three such concentric units superimposed upon each other, the two inner units and the cooking vessels being shown in dotted lines, Fig. 3 is a section on line 3—3 of Fig. 2, Fig. 4 is a horizontal section through line 4—4 of Fig. 1, Fig. 5 is a horizontal section through line 5—5 of Fig. 2, and Fig. 6 is a perspective view of the insulating device in the collapsed position, this perspective view correctly representing one or more collapsed units.

The insulating unit is composed of the top 14 preferably made of wood, to which is joined the cylinder 11 made of oil-cloth or similar collapsible waterproof material. This cylinder is joined in an air-tight manner to the top 14 so that when expanded, the top 14 and the cylinder will inclose a column of air therein in an air-tight manner. 21, 20 and 19 represent reinforcing rings of wood at the tops of each cylinder, 24, 23 and 22 similar reinforcing rings but of greater width in the middle of each cylinder, and 25, 26 and 27 represent reinforcing rings at the bottom of said cylinders tending to keep said cylinders in expanded condition when open. 32 represents a handle by which the unit may be grasped, said handle also forming a means for separating the tops of the units from each other as will more clearly be seen from Figs. 2 and 3.

In Fig. 2, 15 represents the top of the largest unit, 14 the middle unit and 13 the smallest unit, of which the cylinders are represented by 12, 11 and 10 respectively, the bases of said cylinders being numbered 16, 17 and 18, said bases being preferably made of wood and fitting accurately into the cylinders 12, 11 and 10. These wooden bases are not attached to the cylinders into which they respectively fit but as shown, can be used separately or in combination to insulate the bottom of the cooking vessel or vessels for which these bases act as supports. 30 represents the cooking vessel in which the food to be cooked is first heated and then placed inside one or more of the insulating units. It is evident that if desired, these units can be used independently, each to insulate a cooking vessel, or can be used in combination to insulate a single vessel. It is evident that a greater insulating effect will be obtained if a number are used in combination as a larger air space and greater insulation is provided in this way. The rings 24, 23 and 22, more clearly shown in Fig. 3, are preferably of a width greater than the rings 21, 20 or 19 so as they will tend to space the respective units from each other when same are in an expanded condition. By making the cylinders 10, 11 or 12 of a waterproof and airproof fabric which is collapsible, such as of oil-cloth, the units may be compressed into very small space when not in use.

By making the cylinders fit the tops in an air-tight manner a column of air is inclosed tightly in each unit and as the heated air tends to stay on top, there is an absence of convection currents when the device is used as a fireless cooker.

When used as a refrigerator, an open pan is substituted for the cooking vessel, ice being put in the open pan and it will be found that this device provides a convenient portable refrigerator of excellent insulating quality. If preferred, the cylinders 10, 11 and 12 may be made in a fluted or corrugated manner so as to assist in the expansion and contraction of same along predetermined lines.

What I claim is:—

1. A heat insulating unit comprising an air-tight and waterproof cylindrical collapsible hood adapted to cover a cooking vessel when in an expanded condition, means for keeping the bottom and center of said hood in an expanded condition, and means for closing the bottom of said hood.

2. A heat insulating device comprising an air-tight rigid top member, a cylindrical member made of waterproof collapsible fabric joined thereto so as to confine an air space when the cylindrical member is expanded, means for keeping the opposite end of said cylindrical member in an expanded condition, and means for closing the bottom of said cylindrical member.

3. A fireless cooker comprising a series of independent hoods of varying diameter, independent means for closing each of said hoods at the bottom, said hoods being capable of being employed separately to inclose a series of cooking vessels or in combination, to inclose a single cooking vessel.

4. A fireless cooker comprising a series of independent hoods of varying diameter, independent means for closing each of said hoods at the bottom, said hoods being capable of being employed separately to inclose a series of cooking vessels or in combination, to inclose a single cooking vessel, and each of said hoods having means in the interior thereof for spacing said hoods from each other.

5. A fireless cooker comprising a series of independent hoods of varying diameter, independent means for closing each of said hoods at the bottom, said hoods being capable of being employed separately to inclose a series of cooking vessels or in combination, to inclose a single cooking vessel, and means for spacing each of said hoods at predetermined distances from each other.

6. A fireless cooker comprising a series of independent collapsible hoods of varying diameters and bases fitting each of said hoods, each hood and base constituting an independent heat insulating unit, said bases and hoods also being capable of being employed in combination with each other to form a series of concentric hoods and a single bottom for said series of hoods.

In testimony whereof I hereunto affix my signature.

HUGO MOCK.